US009413516B2

(12) United States Patent
Khandani

(10) Patent No.: US 9,413,516 B2
(45) Date of Patent: Aug. 9, 2016

(54) WIRELESS FULL-DUPLEX SYSTEM AND METHOD WITH SELF-INTERFERENCE SAMPLING

(71) Applicant: Amir Keyvan Khandani, Kitchener (CA)

(72) Inventor: Amir Keyvan Khandani, Kitchener (CA)

( * ) Notice: Subject to any disclaimer, the term of this patent is extended or adjusted under 35 U.S.C. 154(b) by 92 days.

(21) Appl. No.: 14/301,076

(22) Filed: Jun. 10, 2014

(65) Prior Publication Data

US 2015/0156003 A1 Jun. 4, 2015

Related U.S. Application Data

(60) Provisional application No. 61/910,332, filed on Nov. 30, 2013, provisional application No. 61/916,511, filed on Dec. 16, 2013.

(51) Int. Cl.
*H04B 7/005* (2006.01)
*H04L 5/14* (2006.01)
*H04B 1/525* (2015.01)

(52) U.S. Cl.
CPC ............... *H04L 5/143* (2013.01); *H04B 1/525* (2013.01)

(58) Field of Classification Search
CPC ....... H04L 5/143; H04L 1/0031; H04B 1/525
USPC ........................................................ 370/278
See application file for complete search history.

(56) References Cited

U.S. PATENT DOCUMENTS

| 4,750,165 A | 6/1988 | Champagne |
| 5,383,224 A * | 1/1995 | Mizoguchi ............. H04B 7/002 370/201 |
| 5,691,978 A | 11/1997 | Kenworthy |
| 6,608,864 B1 | 8/2003 | Strait |
| 6,621,876 B2 | 9/2003 | Camp et al. |
| 6,917,597 B1 | 7/2005 | Schmidl et al. |

(Continued)

FOREIGN PATENT DOCUMENTS

| GB | 1091437 | 11/1967 |
| JP | 10502220 A | 2/1998 |

(Continued)

OTHER PUBLICATIONS

International Search Report and Written Opinion for PCT/US2014/042136 mailed on Dec. 9, 2014.

(Continued)

*Primary Examiner* — Sai-Ming Chan
(74) *Attorney, Agent, or Firm* — Invention Mine LLC

(57) ABSTRACT

A full-duplex transceiver is provided with componentry and methods for cancellation of nonlinear self-interference signals. The transceiver is capable of receiving an incoming radio-frequency signal that includes both a desired radio-frequency signal component and a self-interference component caused by the transceiver's own radio-frequency transmission. The transceiver demodulates the incoming radio-frequency signal to generate a first demodulated signal. The transceiver combines an analog corrective signal with the first demodulated signal to generate a second demodulated signal with reduced self-interference. The transceiver processes the first and second demodulated signals to determine a desired incoming baseband signal and to determine nonlinear components of the self-interference signal, such as nonlinearities introduced by the transceiver's power amplifier.

31 Claims, 8 Drawing Sheets

(56) References Cited

U.S. PATENT DOCUMENTS

| | | |
|---|---|---|
| 7,002,518 B2 | 2/2006 | Lin |
| 7,065,036 B1 | 6/2006 | Ryan |
| 7,096,042 B2 | 8/2006 | Marinier |
| 7,184,466 B1 | 2/2007 | Seemann |
| 7,346,100 B2 | 3/2008 | Kumar |
| 7,706,744 B2 | 4/2010 | Rodgers |
| 7,817,641 B1 | 10/2010 | Khandani |
| 8,107,906 B2 | 1/2012 | Lum et al. |
| 8,208,628 B2 | 6/2012 | Yener |
| 8,238,551 B2 | 8/2012 | Reznik |
| 8,280,046 B2 | 10/2012 | Rudolf |
| 8,306,480 B2 | 11/2012 | Muhammad |
| 8,351,874 B2 | 1/2013 | Dent |
| 8,373,582 B2 | 2/2013 | Hoffberg |
| 8,401,196 B2 | 3/2013 | Goldberg |
| 8,897,269 B2 | 11/2014 | Ji |
| 8,976,641 B2 | 3/2015 | Choi |
| 9,036,749 B2 | 5/2015 | Choi |
| 9,054,795 B2 | 6/2015 | Choi |
| 9,077,421 B1 | 7/2015 | Mehlman |
| 2002/0032004 A1 | 3/2002 | Widrow |
| 2003/0114128 A1 | 6/2003 | Haapoja |
| 2004/0022229 A1 | 2/2004 | Vanness |
| 2005/0020771 A1 | 1/2005 | Ahmed |
| 2005/0057420 A1 | 3/2005 | Lin |
| 2005/0083863 A1 | 4/2005 | Umei |
| 2005/0275576 A1 | 12/2005 | Fudge et al. |
| 2006/0045063 A1 | 3/2006 | Stanford |
| 2007/0026804 A1 | 2/2007 | Ishibashi |
| 2007/0036353 A1 | 2/2007 | Reznik |
| 2007/0063875 A1 | 3/2007 | Hoffberg |
| 2007/0082617 A1 | 4/2007 | McCallister |
| 2007/0254692 A1 | 11/2007 | McCoy |
| 2008/0009257 A1 | 1/2008 | Safarian |
| 2008/0107046 A1* | 5/2008 | Kangasmaa .......... H04B 1/525 370/278 |
| 2008/0123851 A1 | 5/2008 | Guccione |
| 2009/0092072 A1 | 4/2009 | Imamura |
| 2009/0141900 A1 | 6/2009 | Ye |
| 2009/0186582 A1 | 7/2009 | Muhammad |
| 2009/0213770 A1 | 8/2009 | Mu |
| 2009/0253385 A1 | 10/2009 | Dent |
| 2009/0284218 A1 | 11/2009 | Mohammadian |
| 2010/0008406 A1 | 1/2010 | Sawai |
| 2010/0020771 A1 | 1/2010 | Ji |
| 2010/0022201 A1 | 1/2010 | Vandenameele |
| 2010/0086012 A1 | 4/2010 | Rofougaran |
| 2010/0232324 A1 | 9/2010 | Radunovic |
| 2010/0248714 A1 | 9/2010 | Kang |
| 2010/0271987 A1 | 10/2010 | Chiu |
| 2011/0149714 A1 | 6/2011 | Rimini |
| 2012/0159279 A1 | 6/2012 | Braithwaite |
| 2012/0200158 A1 | 8/2012 | Takei |
| 2012/0201153 A1 | 8/2012 | Bharadia |
| 2012/0201173 A1 | 8/2012 | Jain |
| 2012/0281834 A1 | 11/2012 | Reznik |
| 2012/0300680 A1 | 11/2012 | Pietsch |
| 2013/0044791 A1 | 2/2013 | Rimini |
| 2013/0301487 A1 | 11/2013 | Khandani |
| 2014/0126675 A1 | 5/2014 | Monsen |
| 2014/0135056 A1 | 5/2014 | Wang |
| 2014/0169236 A1 | 6/2014 | Choi |
| 2014/0204808 A1 | 7/2014 | Choi |
| 2014/0219139 A1 | 8/2014 | Choi |
| 2015/0043323 A1 | 2/2015 | Choi |
| 2015/0043685 A1 | 2/2015 | Choi |
| 2015/0049834 A1 | 2/2015 | Choi |
| 2015/0063176 A1 | 3/2015 | Hong |
| 2015/0078217 A1 | 3/2015 | Choi |
| 2015/0139284 A1 | 5/2015 | Choi |
| 2015/0171903 A1 | 6/2015 | Mehlman |
| 2015/0188646 A1 | 7/2015 | Bharadia |
| 2015/0236750 A1 | 8/2015 | Choi |
| 2015/0263780 A1 | 9/2015 | Mehlman |
| 2015/0280893 A1 | 10/2015 | Choi |
| 2015/0333847 A1 | 11/2015 | Bharadia |
| 2015/0341125 A1 | 11/2015 | Bharadia |

FOREIGN PATENT DOCUMENTS

| | | |
|---|---|---|
| KR | 1020040096404 | 11/2004 |
| KR | 1020070072629 | 7/2007 |
| KR | 1020120080231 | 7/2012 |
| WO | 9622643 | 7/1996 |
| WO | 03098823 | 11/2003 |
| WO | 2010005951 | 1/2010 |
| WO | 2011065020 | 6/2011 |
| WO | 2011148341 A1 | 12/2011 |

OTHER PUBLICATIONS

Gharavol, E., et al., "Robust Joint Optimization of MIMO Two-Way Relay Channels With Imperfect CSI", Communication, Control, and Computing (Allerton), 2011 49th Annual Allerton Conference on, IEEE, Sep. 28, 2011, pp. 1657-1664, XP032085749, DOI: 10.1109/Allerton.2011.6120368, ISBN: 978-1-4577-1817-5.

Vaze, R., et al., "To Code or Not to Code in Multi-Hop Relay Channels", ARXIV.ORG, Cornell University Library, May 20, 2008, XP080418936, 30 pages.

International Search Report and Written Opinion for PCT/US2013/040822 mailed Jul. 18, 2013.

International Search Report for PCT/US2013/040818 mailed Jul. 24, 2013.

Jung Il, ., "Achieving single channel, full duplex wireless communication", Proceedings from the Annual International Conference on Mobile Computing and Networking, MOBICOM-MOBICOM' 10 and MOBIHOC' 10—Proceedings of the 16th Annual International Conference on Mobile Computing and Networking and 11th ACM International Symposi, Sep. 20, 2010, pp. 1-12, XP002696691.

EP Extended European Search Report for EP App. No. 13790076.7, dated Mar. 2, 2016, 8 pages.

Extended European Search Report for EP App. 13790948.7, dated Nov. 4, 2015, 9 pages.

Provisional Application, entitled: "Tuning Algorithm for Multi-Tap Signal Cancellation Circuit", U.S. Appl. No. 61/754,447, filed on Jan. 18, 2013.

Provisional Application, entitled: "Signal Cancellation Using Feedforward and Feedback", U.S. Appl. No. 61/760,518, filed on Feb. 4, 2013.

Provisional Application, entitled: "Feed Forward Signal Cancellation", U.S. Appl. No. 61/736,726, filed on Dec. 13, 2012.

Jain, M., "Practical, Real-Time, Full Duplex Wireless", MobiCom '11, Sep. 19-23, 2011, Las Vegans, NC, USA, 2011, 12 pages.

Provisional Application, entitled: "Adaptive Non-Linear Digital Cancellation for Full-Duplex Duplex Radios", U.S. Appl. No. 61/864,453, filed on Aug. 9, 2013.

Provisional Application, entitled: "Cancellation Circuit With Variable Delay and Amplifier", U.S. Appl. No. 61/876,663, filed on Sep. 11, 2013.

Provisional Application, entitled: "Frequency Independent Analog Cancellation Circuit", U.S. Appl. No. 61/864,459, filed on Aug. 9, 2013.

Provisional Application, entitled: "Hybrid IF/RF Digital Cancellation Architectures for Full-Duplex Radios", U.S. Appl. No. 61/915,431, filed on Dec. 12, 2013.

Provisional Application, entitled: "Method and Apparatus for Mitigating Phase Noise to Improve Self-Interference Cancellation", U.S. Appl. No. 61/865,943, filed on Aug. 14, 2013.

Provisional Application, entitled: "Near Band Cancellation", U.S. Appl. No. 61/970,852, filed on Mar. 26, 2014.

Provisional Application, entitled: "Self Interference Cancellation Architecture for In-Band Full Duplex Relay Node", U.S. Appl. No. 61/871,519, filed on Aug. 29, 2013.

Provisional Application, entitled: "Techniques For Digital Interference Cancellation", U.S. Appl. No. 62/002,578, filed on May 23, 2014.

(56) References Cited

OTHER PUBLICATIONS

Provisional Application, entitled: "Tunable Self Interference Cancellation", U.S. Appl. No. 61/950,742, filed on Mar. 10, 2014.
Provisional Application, entitled: "Interference Cancellation Architectures With Frequency Isolation", U.S. Appl. No. 62/030,240, filed on Jul. 29, 2014.
International Search Report and Written Opinion for PCT/US2014/051137 mailed Nov. 24, 2014.
McMichael, J. G., et al., "Optimal tuning of analog self-interference cancellers for full-duplex wireless communication". IEEE, Fiftieth Annual Allerton Conference, Oct. 1-5, 2012, p. 246-251.
International Search Report and Written Opinion from PCT/US2014/050968 mailed on Nov. 19, 2014.
Persson, D., et al., "Joint Source-Channel Coding for the MIMO Broadcast Channel", IEEE Transactions on Signal Processing, vol. 60, No. 4, Apr. 2012, pp. 2085-2090.
Chen, B., et al., "Quantization Index Modulation: A Class of Provably Good Methods for Digital Watermarking and Information Embedding", IEEE Transaction on Information Theory, vol. 47, No. 4, May 2001, pp. 1423-1443.
EP Extended Search Report for EP App. No., 13790160.9-1874, dated Jan. 16, 2016, 9 pages.

* cited by examiner

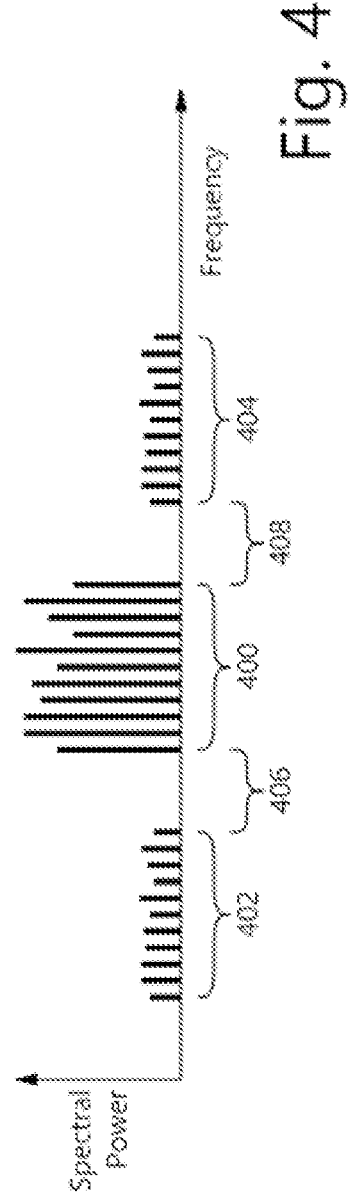
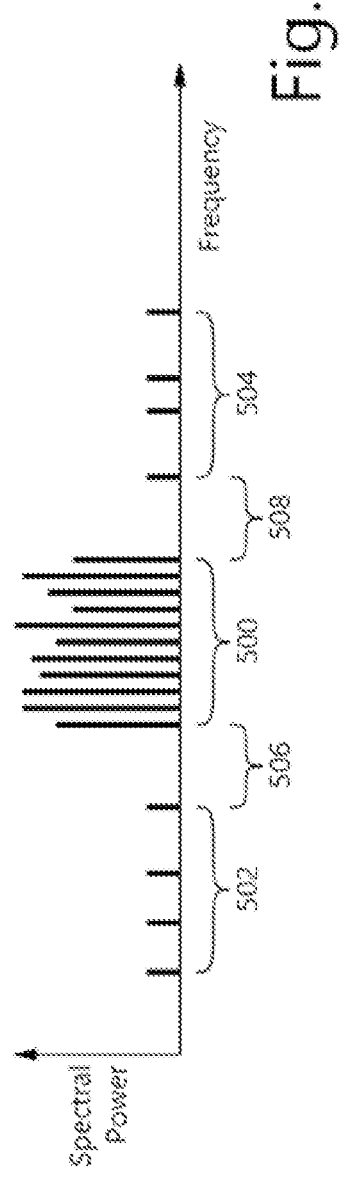

WIRELESS FULL-DUPLEX SYSTEM AND METHOD WITH SELF-INTERFERENCE SAMPLING

CROSS-REFERENCE TO RELATED APPLICATIONS

The present application is a non-provisional filing of, and claims benefit under 35 U.S.C. §119(e) from the following applications: U.S. Provisional Patent Application Ser. No. 61/910,332, filed Nov. 30, 2013, U.S. Provisional Patent Application Ser. No. 61/916,511, filed Dec. 16, 2013, both of which are incorporated herein by reference in their entirety.

FIELD

The present disclosure relates to wireless communications. In particular, the present disclosure relates to systems and methods to establish two-way (full-duplex) wireless links.

BACKGROUND

A communication link with capability to support connections in both transmit and receive directions at the same time and over the entire frequency band is called full-duplex, or two-way. In contrast, a link that can support connection in only one direction at a time (over a given frequency band) is called one-way or half-duplex. Current wireless systems are one-way and rely on either separate time slots (time division duplex) or separate frequency bands (frequency division duplex) to transmit and to receive. These alternatives have their pros and cons, but both suffer from lack of ability to transmit and to receive concurrently over entire frequency band. Even in the context of Orthogonal Frequency Division Multiple Access (OFDMA), where different frequency tones are used to simultaneously service multiple users, there is no method known to use the OFDM tones in opposite directions. A similar shortcoming exists in the context of Code Division Multiple Access (CDMA). Although full-duplex wireless is theoretically possible, its implementation is difficult due to an excessive amount of interference caused by a transmitter to its own receiver(s).

Full-duplex communication is currently used in many applications, e.g., wired telephones, digital subscriber line, wireless with directional antennas, and free-space optics. The impact of full-duplex links in these earlier applications is limited to doubling the communications rate by providing two symmetrical pipes of data flowing in opposite directions. In contrast, in multi-user wireless systems, due to the broadcast nature of transmission (everyone hears everyone else), full-duplex capability has the potential to do more than merely double the communications rate. A summary of some of the benefits of full-duplex is as follows.

Full-duplex facilitates wireless networking In particular, the ability to handle asynchronous users enables superimposing a half-duplex, low bit rate, low power, easy to detect network for control signaling superimposed (physical overlay, rather than logical) on top of the network of primary full-duplex data links The superimposed links are separated from the primary full-duplex data links in the code domain, and use time multiplexing plus Carrier Sense Multiple Access (CSMA) among themselves. However, the conventional problems of CSMA are avoided as control links operate in parallel with primary full-duplex data links. The physical layer of control links is designed such that full-duplex data links can detect and cancel the interference caused by the superimposed control links.

Full-duplex enhances security through desirable jamming.

Full-duplex facilitates multi-node distributed & collaborative signaling, including realization of Network Information Theoretic setups, and cognitive wireless.

Full-duplex, through exploiting feedback, improves point-to-point throughput, and enables ultra-low power transmission.

Full-duplex doubles the point-to-point throughput.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 4 is a schematic graph illustrating the spectral power density of an outgoing communication signal combined with a pair of sideband test signals according to an embodiment described herein.

FIG. 5 is another schematic graph illustrating the spectral power density of an outgoing communication signal combined with a pair of sideband test signals according to an embodiment described herein.

DETAILED DESCRIPTION OF THE INVENTION

Figure 1:
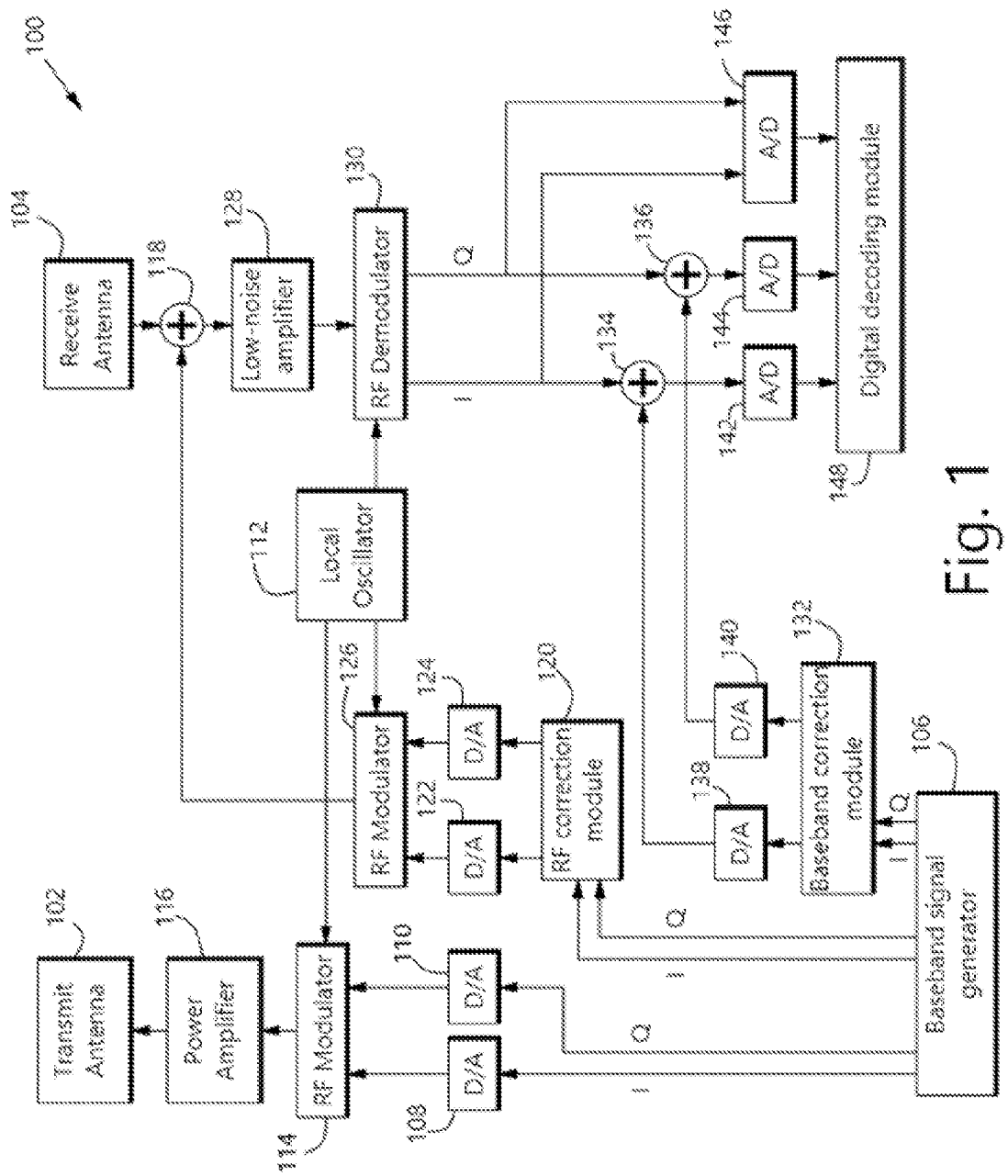
FIG. 1 is a functional block diagram of a full-duplex transceiver according to an embodiment described herein.

The present disclosure describes systems and methods performed in a full-duplex transceiver.

In one such method, the transceiver receives an incoming radio-frequency signal that includes both a desired radio-frequency signal component and a self-interference component caused by the transceiver's own radio-frequency transmission. The transceiver demodulates the incoming radio-frequency signal to generate a first demodulated signal. The transceiver also generates a first analog corrective signal and combines the first analog corrective signal with the first demodulated signal to generate a second demodulated signal with reduced self-interference. The transceiver samples the first demodulated signal to obtain a sampled self-interference component; and the transceiver processes at least the second demodulated signal and the sampled self-interference component to determine a desired incoming baseband signal. The transceiver may also generate a second analog corrective signal at a radio frequency that is combined with the incoming radio-frequency signal before demodulation to cancel at least a portion of the self-interference component.

The generation of the first and second corrective signals may be performed by generating a combined corrective signal at a digital-to-analog converter. The combined corrective signal is modulated to generate the second analog corrective signal at the radio frequency. The combined corrective signal is also filtered to generate the first analog corrective signal. In embodiments in which the combined corrective signal includes a baseband corrective signal component, the combined corrective signal is low-pass filtered to generate a baseband corrective signal. In embodiments in which the combined corrective signal includes an intermediate-frequency corrective signal component, the combined corrective signal is band-pass filtered to generate an intermediate-frequency corrective signal.

In order to recover the data from the desired incoming baseband signal, the transceiver may perform maximal-ratio combining of at least the second demodulated signal and the sampled self-interference component. Alternatively, or in addition, the transceiver may perform minimum mean square error processing of at least the second demodulated signal and the sampled self-interference component.

During this signal cancellation process, the transceiver may also simultaneously transmit outgoing radio-frequency signals on substantially the same frequency as the incoming radio-frequency signal. To do this, the transceiver may modulate an outgoing baseband signal to generate an outgoing radio-frequency communication signal. The transceiver then amplifies the outgoing radio-frequency communication signal using a power amplifier and transmits the outgoing radio-frequency communication signal from a transmit antenna. It is this simultaneous transmission that generates the self-interference component received at the receive antenna of the full-duplex transceiver.

To generate the first analog corrective signal, the transceiver may apply a predetermined transformation to a local copy or replica of the outgoing baseband signal. In addition, the transceiver may process the sampled self-interference component to determine the nonlinear distortion introduced by the power amplifier, and this information regarding the nonlinear distortion may be used in determining the predetermined transformation to be applied to the local copy of the outgoing baseband signal to generate the first analog corrective signal. Thus, in this embodiment, the nonlinear distortion caused by the power amplifier is measured and modeled based on the sampled self-interference component, and the model is used to create the first analog corrective signal.

In some embodiments, the first analog corrective signal and the first demodulated signal are intermediate-frequency (IF) signals. The demodulation of the incoming radio-frequency signal to generate the first demodulated signal may be performed without the use of image-rejection circuitry.

In another method performed by a full-duplex transceiver, a combined radio-frequency communication signal is generated. The combined signal includes (i) an outgoing radio-frequency communication signal that has one center frequency (i.e., a band of frequencies centered at one center frequency), and (ii) a radio-frequency test signal that has a different center frequency. The transceiver amplifies the combined radio-frequency communication signal using a power amplifier and transmits the amplified combined radio-frequency communication signal from a transmit antenna. Due to self-interference, the full-duplex transceiver also receives an incoming radio-frequency signal that includes a radio-frequency test component caused by the transmitted radio-frequency test signal and a self-interference component caused by the transmitted radio-frequency communication signal. The transceiver demodulates the incoming signal, and samples the demodulated test component to obtain a sampled test component. The transceiver then processes the sampled test component to determine nonlinear distortion introduced by the power amplifier. The transceiver may also generate a radio-frequency corrective signal that is combined with the incoming radio-frequency signal to cancel at least a portion of the self-interference component. Preferably, the radio-frequency corrective signal cancels a substantial portion of the self-interference component but does not cancel the radio-frequency test component.

The sideband radio frequency test signal has a power substantially less than the power of the radio frequency communication signal, preferably a power at least 20 dB less than the power of the radio frequency communication signal. Preferably, the sideband radio frequency test signal has a power substantially greater than the power of the desired incoming radio-frequency signal component. For example, the sideband radio test signal may have a power at least 20 dB greater than the power of the desired incoming radio-frequency signal component.

The combined radio-frequency communication signal may further include a second radio-frequency test signal, where the first radio-frequency test signal has a center frequency lower than the center frequency of the outgoing radio-frequency communication signal, and the second radio frequency test signal has a center frequency higher than the center frequency of the outgoing radio-frequency communication signal. In this case, the incoming radio-frequency signal includes a first and a second radio-frequency test component caused by the respective first and second radio-frequency test signals. The demodulation thus involves demodulating both the first and second radio-frequency test components to obtain respective first and second demodulated test components. Likewise, the sampling process then includes sampling the first and second demodulated test component to obtain respective first and second sampled test components. The transceiver then processes both the first and second sampled test components to determine nonlinear distortion introduced by the power amplifier.

The radio-frequency test signal may include a plurality of subcarrier signals. In this case, the transceiver can processes the subcarrier signals to determine intermodulation distortion between the subcarrier signals.

A full-duplex transceiver described herein includes a radio-frequency modulator operative to modulate an outgoing baseband signal into an outgoing radio-frequency communication signal. The transceiver further includes a transmit antenna operative to transmit the outgoing radio-frequency communication signal and a receive antenna operative to receive an incoming radio-frequency signal. The transceiver includes a radio-frequency demodulator, which is operative to demodulate the incoming radio-frequency signal to generate a first demodulated signal. The transceiver further includes a baseband correction module that is operative to generate a baseband analog corrective signal based on the outgoing baseband signal, as well as baseband signal addition circuitry, which adds the baseband analog corrective signal to the first demodulated signal to generate a second demodulated signal with reduced self-interference. A first analog-to-digital converter works to sample the first demodulated signal, and a second analog-to-digital converter works to sample the second demodulated signal. A digital decoding module of the transceiver is operative to determine a desired incoming baseband signal based at least on the sampled first and second demodulated signals. The transceiver may also include a radio-frequency correction module that generates a radio-frequency analog corrective signal, and radio-frequency signal addition circuitry that adds the radio-frequency analog corrective signal to the incoming radio-frequency signal to aid in cancelling the self-interference signal.

As illustrated in FIG. 1, a full duplex transceiver 100 is provided with both a transmit antenna 102 and a receive antenna 104. The full duplex transceiver 100 is preferably operable to transmit radio frequency signals on the transmit antenna 102 while simultaneously receiving radio frequency signals on the receive antenna 104 on the same frequency.

To transmit signals, the transceiver 100 includes a baseband signal generator 106 that generates the outgoing baseband signals containing information to be transmitted in digital form. In some embodiments, the baseband signal generator 106 generates orthogonal frequency division multiplexing (OFDM) signals, which employ quadrature amplitude modulation (QAM) and thus have an in-phase component (I) and a quadrature component (Q). The baseband signal may encode any of a variety of types of information, including voice and data information, according to any of a variety of coding schemes known to those skilled in the art. While the use of OFDM baseband signals is illustrated here by way of example, the principles described herein can be implemented using alternative types of signaling, such as phase-shift keying (PSK), frequency-shift keying (FSK), or amplitude-shift keying (ASK), among others.

The digital in-phase (I) and quadrature (Q) components of the baseband signal are converted to analog baseband signals using respective digital-to-analog converters 108, 110. In some embodiments, the signals provided by the baseband signal generator 106 are digital signals in the frequency domain. In such embodiments, the digital signals in the frequency domain may be converted into digital signals in the time domain by application of an inverse fast Fourier transform (inverse FFT), for example by a dedicated inverse FFT chip (not illustrated), prior to conversion to analog signals in the time domain by the digital-to-analog converters 108, 110.

A local oscillator 112 provides a radio-frequency signal that is used by a radio-frequency modulator 114 to modulate the analog baseband communication signal to radio frequency. The radio-frequency modulator 114 may include a frequency mixer. In embodiments that make use of OFDM signaling, the in-phase and quadrature analog components of the analog baseband signal may be separately modulated by respective in-phase and quadrature components of the local oscillator signal and may then be added together for transmission.

The radio-frequency communication signal generated by the radio-frequency modulator 114 is then amplified by a power amplifier 116. While an ideal power amplifier would simply increase the amplitude of the radio-frequency communication signal by a scalar factor, in practice, the power amplifier 116 introduces nonlinear distortions in the signal being amplified. The power amplifier 116 is coupled to the transmit antenna 102 to wirelessly transmit the radio-frequency communication signal.

To permit simultaneous transmission and receipt of radio frequency signals by the full-duplex transceiver 100, it is desirable to minimize the interference at the receive antenna 104 caused by the transmit antenna 102. Nonlinear compensation methods will generally not provide satisfactory results if the level of nonlinear leakage is high. Due to this reason, it is important to minimize the coupling between transmit and receive chains prior to active cancellation. This enables a level of overall isolation that would not be feasible through linear signal processing techniques. As an example, numerical errors in a 14 bit, 64-point inverse FFT operation, with an optimized fixed-point arithmetic design, are about −80 dB below the signal level. This is also in accordance with the theoretical resolution of a 14 bit digital-to-analog (D/A) converter, which is widely available and a reasonable D/A choice for cost effective implementation. Under this condition, a transmit signal at 30 dBm can result in numerical errors at −60 dBm. If radio-frequency isolation between transmit and receive chain is −50 dB, then the numerical errors (at −110 dbm) will be below the thermal noise level. In practice, such errors should be comparable to the noise level, which enables subsequent signal processing to account for and compensate the nonlinear effects.

One way to help minimize the interference at the receive antenna 104 caused by the transmit antenna 102 is to design and orient the transmit antenna 102 and the receive antenna 104 to minimize electromagnetic coupling between those antennas. For example, the transmit and receive antennas may be pairwise symmetrical. That is, the transmit and receive antennas have separate planes of symmetry, and each antenna is also symmetric with respect to reflection in the plane of symmetry of the other antenna. As an alternative, patch antennas can be used in which one arm of an antenna is generated through reflection of the other arm in the ground plane. As another alternative to pairwise symmetrical structures, it is possible to place one set of antennas in the plane of symmetry of another set, which is shown to be an equipotential surface. While such orientations theoretically reduces coupling between the antennas to zero, in practice, some coupling still remains between the transmit antenna 102 and the receive antenna 104.

During operation of the full-duplex transceiver 100, the receive antenna 104 receives an incoming radio-frequency signal. The incoming radio-frequency signal can include both a desired radio-frequency signal component (transmitted by another transmitter) and a self-interference component caused by transmission from the transmit antenna 102.

To cancel out at least a portion of the self-interference component, the full duplex transceiver 100 is provided with radio frequency signal addition circuitry 118 to combine the incoming radio-frequency signal with an analog radio-frequency corrective signal. To generate the analog radio-frequency corrective signal, the transceiver 100 is provided with a radio frequency correction module 120. The radio frequency correction module 120 processes the digital baseband signal from the baseband signal generator 106 to generate a digital baseband signal that is converted by analog-to-digital converters 122, 124 into an analog baseband signal. This analog baseband signal is in turn modulated by a radio-frequency modulator 126 to generate the analog radio-frequency corrective signal. The radio-frequency modulator 126 preferably makes use of the same local oscillator 112 as the radio-frequency modulator 114.

The radio-frequency correction module 120 is configured to process the outgoing baseband signal such that the analog radio-frequency corrective signal generated at the radio-frequency modulator 126 cancels at least a portion of the self-interference component when the signals are combined at the radio-frequency signal addition circuitry 118. For example, the radio-frequency correction module 120 may apply a transfer function to the baseband signal that imitates the coupling characteristics along the path from the baseband signal generator 106, through the transmit antenna 102, to the receive antenna 104. The radio-frequency correction module 120 thus increases the extent to which the analog radio-frequency corrective signal cancels the self-interference component at the radio-frequency signal addition circuitry 118. The radio-frequency signal addition circuitry 118 may be, for example, a passive transformer circuit, or an RF coupler.

Preferably, after at least a portion of the self-interference signal has been canceled at the radio-frequency signal addition circuitry 118, the resulting incoming radio-frequency signal is sufficiently low that it can be fed to the input of a low-noise amplifier 128 without saturating the input. The radio-frequency signal is amplified by the low-noise amplifier 128 and is demodulated by a radio-frequency demodulator 130. The radio-frequency demodulator is preferably coupled to the local oscillator 112. In the exemplary transceiver 100, the radio-frequency demodulator 130 provides a demodulated signal that includes separate analog in-phase (I) and quadrature (Q) components.

This demodulated signal contains self-interference components that may not have been canceled at the radio-frequency addition circuitry 118. To provide additional self-interference cancellation, the transceiver 100 is provided with baseband signal addition circuitry 134, 136, to combine the demodulated signal with a baseband analog corrective signal. The baseband analog corrective signal is provided with a baseband correction module 132. The baseband correction module 132 processes the digital baseband signal from the baseband signal generator 106 to generate a digital baseband signal that is converted by analog-to-digital converters 138, 140 into a baseband analog corrective signal.

The baseband correction module 132 is configured to process the outgoing baseband signal such that the baseband analog corrective signal cancels at least a portion of the self-interference component when the signals are combined at the baseband signal addition circuitry 134, 136. For example, when the baseband signal is stored as digital values in the frequency domain, the baseband correction module 132 may apply a transfer function to the baseband signal that imitates the coupling characteristics along the path from the baseband signal generator 106, through the transmit antenna 102, to the receive antenna 104, and through the demodulator 130. In some embodiments, the baseband correction module 132 adjusts the amplitude of the baseband analog corrective signal. The baseband correction module 132 thus increases the extent to which the baseband analog corrective signal cancels the self-interference component at the baseband signal addition circuitry 134, 136. The baseband signal addition circuitry 134, 136, may be, for example, a pair of passive transformer circuits, it may be a pair of op-amp signal adders, or it may take other forms.

After the baseband signal passes through the signal addition circuitry 134, 136, the I and Q components of the baseband signal are sampled by respective analog-to-digital converters 142, 144 and converted to digital form for further processing. In parallel, another analog-to-digital converter 146 samples the demodulated signal that has not passed through the baseband signal addition circuitry 134, 136. The analog-to-digital converter 146 may consist of a pair of analog-to-digital converters (analogous to 142, 144) that separately digitize the I and Q components of the baseband signal, or analog-to-digital converter 146 may be a single analog-to-digital converter that takes alternate samples of the I and Q components of the baseband signal.

As a consequence of the self-interference cancellation at the signal addition circuitry 134, 136, the signal sampled by analog-to-digital converters 142, 144 has a greatly reduced self-interference component, and consequently, the component of the signal due to the desired incoming signal is relatively stronger. On the other hand, the signal sampled at the analog-to-digital converter (or converters) 146 has not experienced baseband signal cancellation, and as a result, it is dominated by the self-interference component. The signal sampled by analog-to-digital converter 146 thus provides a measure of the self-interference component caused by radio-frequency transmissions from the transmit antenna 102.

The transceiver 100 is provided with a digital decoding module 148. The digital decoding module 148 is operative to process the signals sampled by the analog-to-digital converters 142, 144, 146 to determine the desired incoming baseband signal. For example, the digital decoding module 148 may employ maximal-ratio combining of the demodulated signal from analog-to-digital converters 142, 144 with the sampled self-interference component sampled by the analog-to-digital converter 146. As an alternative (or in combination), the digital decoding module 148 may perform minimum mean square error processing of the demodulated signal from analog-to-digital converters 142, 144 and the sampled self-interference component sampled by the analog-to-digital converter 146. Where the incoming baseband signal is an OFDM signal, the digital decoding module may operate by performing a fast Fourier transform (FFT) on the incoming signals to identify the subcarrier components of the OFDM signal. In such an embodiment, the digital decoding module 148 may include a dedicated FFT chip.

The digital decoding module 148 may also operate to determine the nonlinear distortion introduced by the power amplifier 116. For example, the digital decoding module 148 may compare the undistorted outgoing baseband signal from baseband signal generator 106 with the distorted self-interference component sampled by the analog-to-digital converter 146. The digital decoding module 148 may generate a model of the distortion introduced by the power amplifier 116, for example by treating the distortion as the output of a Volterra series to which the input is the original outgoing baseband signal. Based on the self-interference component sampled by the analog-to-digital converter 146, the digital decoding module 148 may update the operation of the radio-frequency correction module 120 and the baseband correction module 132 to improve the self-interference signal cancellation introduced by those modules. For example, based on the nonlinear model (e.g., a Volterra series) of distortion introduced by the power amplifier 116, the RF correction module 120 may apply that same model to the outgoing RF corrective signal by modifying the corresponding baseband signal (prior to up-conversion) according to the measured nonlinearity. In that way, the RF corrective signal more closely mimics the self-interference component and thus more fully cancels the self-interference component. Similarly, based on the nonlinear model (e.g., a Volterra series) of distortion introduced by the power amplifier 116, the baseband correction module 132 may apply that same model to the outgoing baseband signal when the baseband analog corrective signal is generated. In that way, the base-band corrective signal more closely mimics the self-interference component and thus more fully cancels the self-interference component.

The process of determining kernel coefficients of a Volterra series based on empirical inputs is known to those skilled in the art. For example, the coefficients of an orthogonalized series such as a Wiener series can be estimated, followed by computation of the kernel coefficients of the Volterra series. Other nonlinear modeling techniques may alternatively be used.

Figure 2:
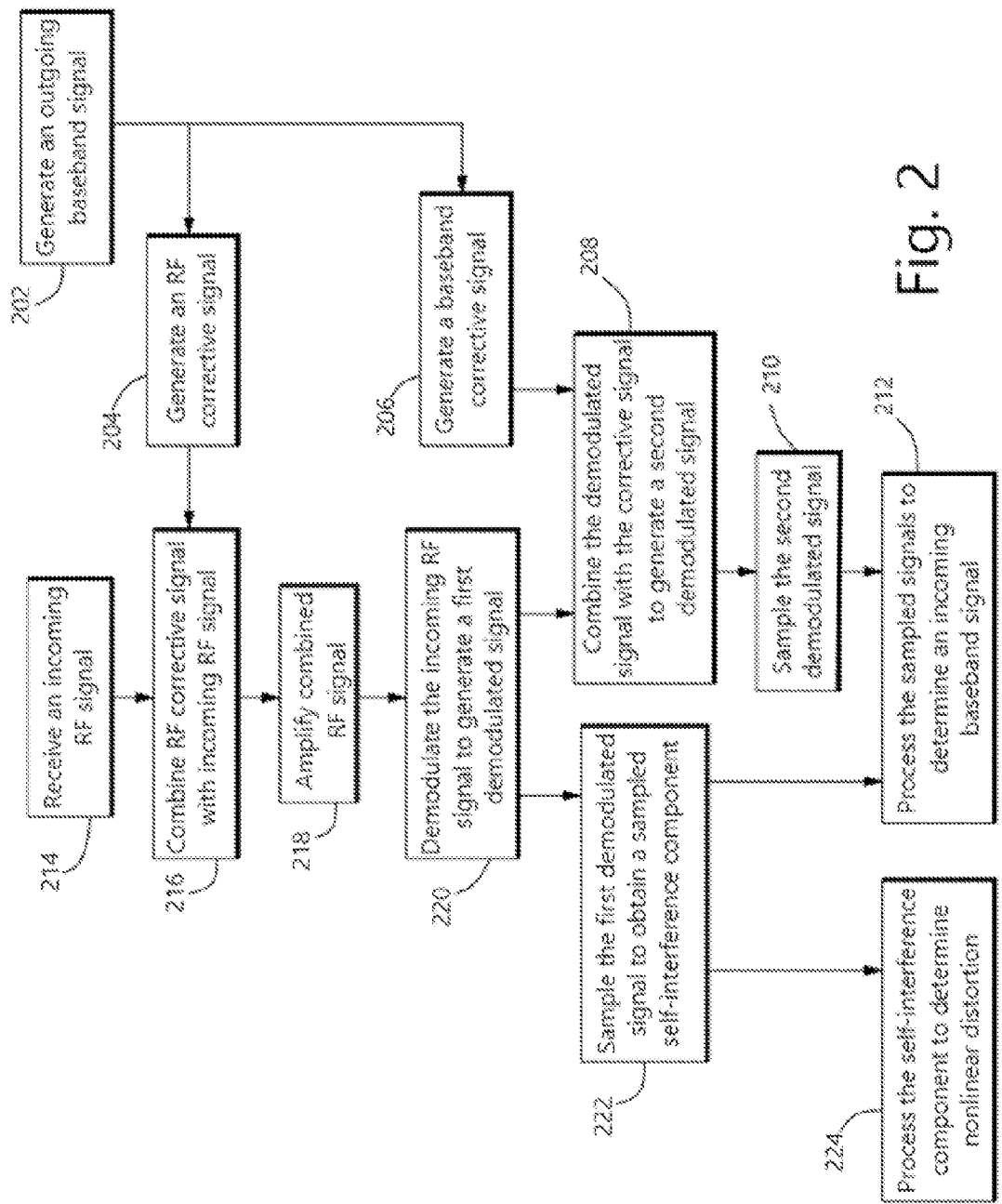
FIG. 2 is a flow diagram of a process performed in a full-duplex transceiver according to an embodiment described herein.

As illustrated in FIG. 2, in a method performed at a full-duplex transceiver, an outgoing baseband signal is generated at step 202. Based on the outgoing baseband signal, an analog radio-frequency corrective signal is generated in step 204, and an analog baseband corrective signal is generated in step 206. These corrective signals may be generated by applying respective predetermined transformations to the outgoing baseband signal. The predetermined transformations may take one or more of several different forms. For example, the predetermined transformations may be implemented by applying a linear transfer function to a digital baseband signal in the frequency domain, by applying a filters to the baseband signal in the time domain, or by applying a nonlinear transformation such as a Taylor series or a Volterra series.

In step 214, the transceiver receives an incoming radio-frequency signal. The incoming radio frequency signal includes a desired radio-frequency signal component sent by a remote transmitter. In full-duplex operation, the transceiver is transmitting an outgoing radio-frequency signal at the same time and on the same frequency as the incoming radio-frequency signal. As a result, the incoming radio-frequency signal also includes a self-interference component.

In step 216, the transceiver combines the radio-frequency corrective signal with the incoming radio-frequency signal to cancel out at least a portion of the self-interference component. In step 218, the resulting signal is amplified by a low-noise amplifier. Preferably, the combination of the radio-frequency corrective signal with the incoming radio-frequency signal in step 216 lowers the level of self-interference sufficiently to prevent saturation of the input of the low noise amplifier.

In step 220, the incoming radio frequency signal is demodulated to generate a first demodulated signal. The first demodulated signal is sampled in step 222, for example by one or more analog-to-digital converters, to obtain a sampled self-interference component. In embodiments in which the first demodulated signal includes an in-phase component (I) and a quadrature component (Q) step 222 may be performed by separately sampling the in-phase and quadrature components of the first demodulated signal with the use of two different analog-to-digital converters. As an alternative, step 222 may be performed by a single analog-to-digital converter that alternately samples the I component and the Q component of the first demodulated signal. In this latter case, the rate of sampling may be increased by a factor of two as compared with the use of separate analog-to-digital converters.

In step 224, the sampled self-interference component is processed to determine the nonlinear distortion in the self-interference component. For example, in step 220, the transceiver may compare the undistorted outgoing baseband signal generated in step 202 with the distorted self-interference component sampled in step 222 to generate a model of the distortion. The distortion being modeled may include distortion introduced by a power amplifier, low-noise amplifier, or other components in the transmit and receive chain of the transceiver. The non-linear distortion may be modeled by, for example by treating the distortion as the output of a Volterra series to which the input is the original outgoing baseband signal.

In step 208, the first demodulated signal is combined with the baseband corrective signal to generate a second demodulated signal. The baseband corrective signal substantially cancels the self-interference component of the incoming signal, but it does not cancel a component of the incoming signal that is attributable to a desired incoming signal from a remote transmitter.

In steps 216 and 208, the signals may be combined with the use of, for example, a passive transformer circuit, a coupler, an op-amp signal adder, or other signal combination circuitry. As will be understood to those of ordinary skill in the art, the signals being combined in steps 216 and 208 are combined so as to effect signal cancellation. To do this, the signal combination circuitry may be configured to subtract one signal from another, or the signals being canceled may be phase-shifted by 180° with respect to one another, or one of the signals may be inverted. Various schemes for canceling signals are known to those skilled in the art.

The generation of the corrective signals in steps 204 and 206 may be performed based on the nonlinear distortion determined in steps 224 to improve the cancellation of the self-interference component in steps 216 and 208. For example, based on the nonlinear model (e.g., a Volterra series) of distortion introduced by a power amplifier and/or other nonlinear components, the corrective signals generated in steps 204 and 206 may be generated by applying that same model to the outgoing baseband signal. In that way, the corrective signals more closely mimic the self-interference component and thus more fully cancel the self-interference component.

In step 210, the second demodulated signal sampled by, for example, an analog-to-digital converter. In step 212, the sampled signals are processed to determine an incoming baseband signal. For example, the transceiver may employ maximal-ratio combining of the sampled first demodulated signal from step 222 with the sampled second demodulated signal from step 210. As an alternative (or in combination), the transceiver may perform minimum mean square error processing of the sampled first demodulated signal from step 222 and the sampled second demodulated signal from step 210. Where the desired incoming baseband signal is an OFDM signal, step 212 may involve performance of a fast Fourier transform to obtain the OFDM subcarrier signals of the incoming OFDM signal.

In an alternative embodiment, an intermediate-frequency corrective signal is used in place of, or in addition to, a baseband corrective signal. For example, with respect to the method illustrated in FIG. 2, the generation of a baseband corrective signal in step 206 may be replaced with the generation of an intermediate-frequency (IF) corrective signal. In such an embodiment, the first demodulated signal generated in step 220 may be an intermediate-frequency demodulated signal. The use of intermediate-frequency processing is useful in full-duplex communications to avoid the problems with the transmission and consequently self-cancellation of DC components, as well as to reduce the effect of I/f noise. In embodiments using intermediate frequencies, it is desirable to have a LO-IF to RF modulator for transmission, and an RF to LO-IF demodulator for reception. In such a case, the LO-IF to RF modulator as well as the RF to LO-IF demodulator are preferably equipped with circuitry for image rejection. Another benefit of working at LO-IF (instead of baseband) is that the complexities of constructing a corrective signal and of sampling a power amplifier output can be reduced.

Figure 8:
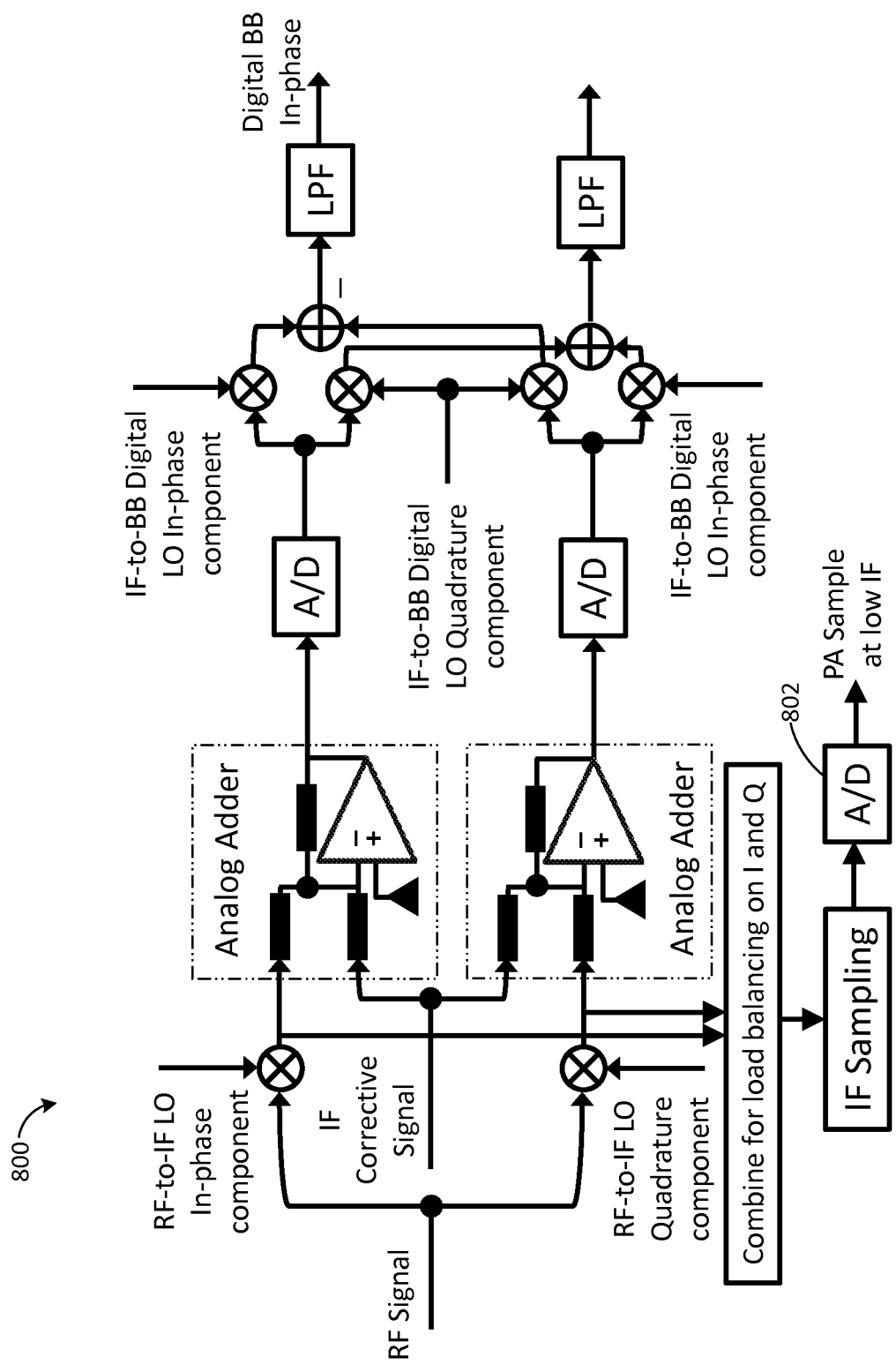
FIGS. 8 is a functional diagram of receive circuitry for use with an intermediate-frequency (IF) cancellation signal.

It should be noted that in RF to LO-IF demodulation of the power amplifier output, there is no strong image present, and consequently, so complicated image-rejection circuitry is not required, and the receiver for sampling power amplifier output can be simplified. FIG. 8 shows an embodiment of receiver circuitry 800 for RF to LO-IF demodulation, wherein the circuit for image rejection is combined with the circuit needed to sample the power amplifier output. In this case, the path for sampling the power amplifier output relies on direct sampling of the IF signal with a single analog-to-digital converter 802. Subsequent down-conversion to base-band and I/Q extractions of the PA sample are achieved using digital processing. Note that methods known for single side-band modulation and Hilbert transform can be used to remove the image in LO-IF to RF modulation.

Figures 9, 10:
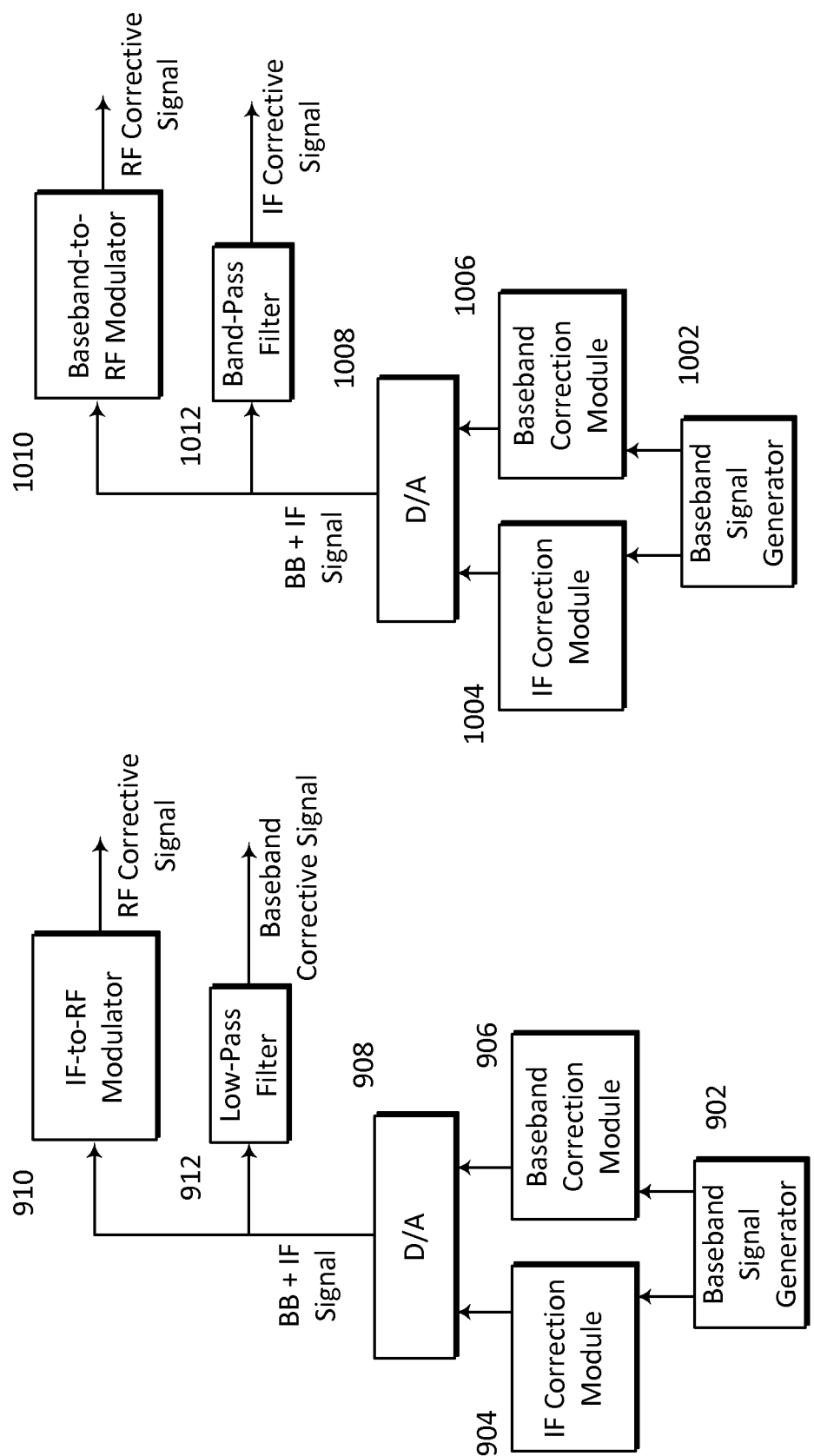
FIG. 9 is a functional block diagrams illustrating componentry for generating a baseband and a radio-frequency corrective signal.
FIG. 10 is a functional block diagrams illustrating componentry for generating an intermediate-frequency and a radio-frequency corrective signal.

Another benefit of working at LO-IF is that the RF corrective signal and the lower frequency (intermediate frequency or baseband) corrective signal can be constructed using a single chain by multiplexing these two corrective signals in the frequency domain. FIGS. 9 and 10 illustrate embodiments wherein the construction of the two corrective signals is performed with the use of a single transmission chain. As illustrated in FIG. 9, a baseband signal generator 902 is provided. From the baseband signal, an intermediate frequency correction module 904 generates a digital intermediate frequency corrective signal, and a baseband correction module 906 generates a digital baseband corrective signal. These signals are multiplexed at a digital-to-analog converter 908, which generates a single combined analog signal with components in the baseband and the intermediate frequencies. The combined analog signal is modulated to radio frequency by an IF-to-RF modulator 910 to generate a radio frequency corrective signal. The combined analog signal is filtered by a low-pass filter 912 to filter out the intermediate frequency component, leaving the baseband corrective signal.

As illustrated in FIG. 10, a baseband signal generator 1002 is provided. From the baseband signal, an intermediate frequency correction module 1004 generates a digital intermediate frequency corrective signal, and a baseband correction module 1006 generates a digital baseband corrective signal. These signals are multiplexed at a digital-to-analog converter 1008, which generates a single combined analog signal with components in the baseband and the intermediate frequencies. The combined analog signal is modulated to radio frequency by a baseband-to-RF modulator 1010 to generate a radio frequency corrective signal. The combined analog signal is filtered by a band-pass filter 1012 to filter out the baseband frequency component, leaving the intermediate frequency corrective signal.

In the embodiments employing intermediate frequencies, different carriers are used for RF up-conversion and for RF down-conversion, and ideally these carriers should have a fixed and stable difference in their frequencies. To provide such stable frequency differences, in some embodiments, the mismatch is measured and accounted for (pre-compensated) in the construction of the low frequency corrective signal. In other embodiments, one RF carrier is generated and mixed with a low frequency sinusoid to generate the second RF carrier, and the low frequency sinusoid is used as the reference in frequency multiplexing of the two corrective signals.

In some embodiments of the full-duplex transceiver, for situations in which the RF corrective signal is generated by re-modulating the primary RF transmit signal, the phase and magnitude of the re-modulating carrier is adjusted to enhance the cancellation. In another embodiment, using a component that introduces an adjustable phase shift and an adjustable magnitude scaling, the power amplifier output can be sampled directly in the transmit chain, passing the corresponding RF signal through the unit to adjust its phase and magnitude, and injecting the resulting RF corrective signal in the receive chain.

In another embodiment, multiple RF corrective paths are deployed in parallel, each coupled to the receive chain, wherein the corresponding couplers to the receive chain are isolated using switchable (low gain/high gain) LNAs. The phase and magnitude of the corrective paths are adjusted sequentially. This means adjustment of the chain indexed by X+1 is performed after the phase and magnitude of the RF corrective signal in earlier RF corrective chains, i.e., 1, ..., X (lower index is closer to the RX antenna) are first adjusted and fixed. Then, in adjusting chain X+1, the LNA separating the couplers corresponding to chains X and X+1 is turned to high gain, and then the phase and magnitude of the corrective path is adjusted to minimize the residual energy of the self-interference. Another embodiment of this invention includes incorporating a variable delay element in each RF corrective path, which adjusts the delay in its corresponding RF corrective path to match the delay of the leakage path it aims to cancel.

In such embodiments, a method for providing self-interference compensation includes sampling the outgoing radio-frequency signal at the radio frequency transmission chain. Preferably, the outgoing radio-frequency signal is sampled at the output of the power amplifier. The sampling may be performed with the use of a radio frequency power divider. The phase and magnitude of the sampled radio-frequency signal is adjusted to generate a radio-frequency corrective signal. The adjustment may be performed with the use of a delay line. The delay introduced by the delay line preferably corresponds to the travel time along an interference path from the transmit antenna to the receive antenna, such that the radio-frequency corrective signal substantially cancels self-interference due to signals that propagate along the corresponding interference path. To perform this cancellation, the corrective signal is combined with the incoming radio-frequency signal in the receive chain of the transceiver.

In embodiments that make use of multiple parallel cancellation paths, a cancellation method involves obtaining a plurality of samples of the outgoing radio-frequency communication signal and successively adjusting the phase and magnitude of each of the sampled radio-frequency communication signals to generate a plurality of radio-frequency corrective signals. The plurality of radio-frequency corrective signals with the incoming radio-frequency signal to reduce the self-interference component. The parallel cancellation paths may be separated by amplifiers or other forms of radio-frequency isolators. In some embodiments, the parallel cancellation paths are tuned successively, such as through adjustment of parallel delay lines. The delay introduced by each respective delay line preferably corresponds to the travel time along an interference path from the transmit antenna to the receive antenna, such that each of the radio-frequency corrective signals substantially cancels self-interference due to signal propagation along a respective interference path.

In some embodiments, the parallel cancellation paths are frequency selective, with each cancellation path being obtained at a different frequency and conveying samples from different portions of the frequency band. In such embodiments, each of the cancellation paths provides radio-frequency correction in a different segment of the frequency band. This allows separate adjustment of the phase and amplitude of corrective signals at different frequencies to allow for potential frequency-dependent attenuation along various self-interference signal paths.

Figure 3:
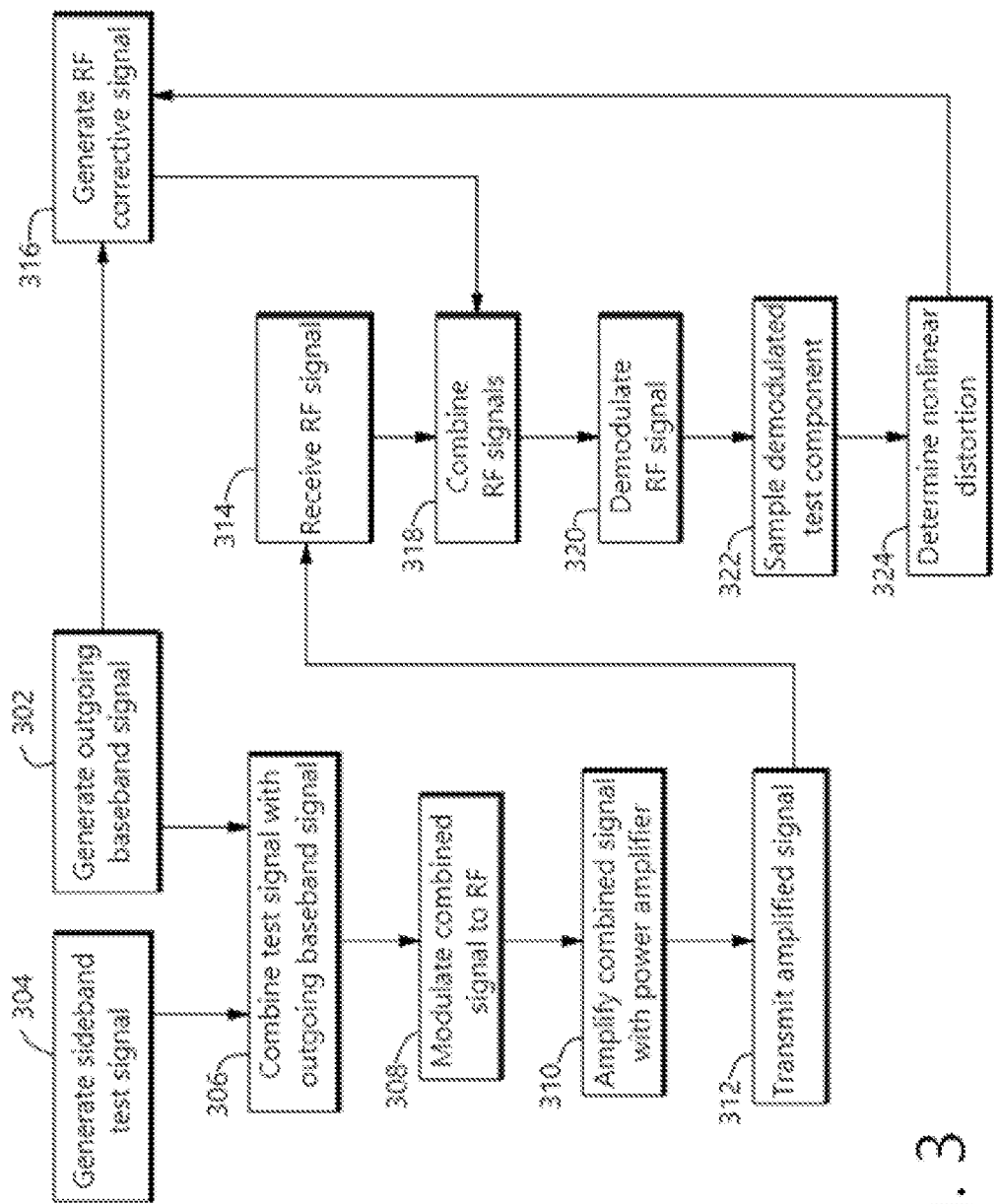
FIG. 3 is a flow diagram of another process performed in a full-duplex transceiver according to an embodiment described herein.

Illustrated in FIG. 3 is a method performed at a full-duplex transceiver for determining nonlinear distortion in a self-interference signal using a sideband test signal. In step 302, the transceiver generates an outgoing baseband signal. In addition, in step 304, the transceiver generates at least one sideband test signal. The sideband test signal has a center frequency different from the center frequency of the outgoing baseband signal. In an example that is particularly useful in OFDM systems, in which the baseband test signal includes a plurality of subcarrier signals, the sideband test signal also includes a plurality of subcarrier signals. In some embodiments, two sideband test signals are generated, one with a center frequency lower than the center frequency of the outgoing baseband signal and one with a center frequency higher than the center frequency of the outgoing baseband signal.

In step 306, the test signal is combined with the outgoing baseband signal. The combination of the test signal with the outgoing baseband signal may be performed in the frequency domain. For example, a combined signal can be generated using a 256-point fast Fourier transform. In such an embodiment, the lowest 64 frequencies may represent a first test signal, followed by 64 frequencies that are set to zero amplitude to provide a first guard band, followed by 64 frequencies representing the outgoing baseband signal, then another guard band of 64 frequencies set to zero amplitude. These frequencies may then be converted to a single time-domain signal by, for example, a dedicated inverse FFT chip.

In step 308, the combined signal is translated, or upconverted, to radio frequency via a mixing operation. By combining the outgoing baseband signal and the test signal and then upconverting those signals to radio frequency, the transceiver generates a combined radio-frequency communication signal that includes (i) an outgoing radio-frequency communication signal having a center frequency and (ii) a radio-frequency test signal that has a center frequency different from the center frequency of the outgoing radio-frequency communication signal. Other techniques for generating such a combined radio-frequency communication signal could also be employed. For example, the test signal and the outgoing baseband signal could be separately modulated to radio frequency and then combined. As another example, the combining at the base-band could be performed using spreading codes, in which case the test signal and the outgoing baseband signals are spread using two spreading codes and added and as a result these two signals would occupy the same frequency band.

In step 310, the combined radio-frequency signal is amplified with a power amplifier. The amplification with the power amplifier introduces undesirable nonlinear distortions in the amplified signal. For example, the power amplifier may introduce intermodulation distortion among the different frequency components of the amplified signal. In step 312, the amplified signal is transmitted by a transmit antenna of the transceiver.

In the amplified combined radio frequency signal, the test signal preferably has a substantially lower power than the communication signal. The relative powers of the radio-frequency test signal and the radio-frequency communication signal are chosen such that the communication signal is powerful enough to be received by a desired receiver, while the test signal is sufficiently weak such that, from the perspective of the desired receiver, the power from the test signal falls below the level of noise at the desired receiver. To accomplish this, the radio-frequency test signal may have a power that is, for example, at least 20 dB less than the power of the radio-frequency communication signal. However, the power of test signal is selected to be significantly above the power of distant signals in the bands occupied by the test signal. For example, the radio-frequency test signal may have a power approximately 40 dB less than the power of the radio-frequency communication signal, and are received (at the same transmitting node) 20 dB above the received power of distant RF signals that may exist in the neighboring frequency bands occupied by the test signals. In another embodiment, for the purpose of measuring the power amplifier noise and non-linearity, the power amplifier output is sampled using a separate receive chain. In such a configuration, to further reduce the level of the test signal in the signal received at distant receivers, filtering can be applied after the component used to sample the power amplifier output and prior to transmit antenna.

In step 314, the transceiver receives at a receive antenna a radio-frequency signal, which includes a self-interference component due to the transmission at step 312. Preferably, the transmit antenna and receive antenna of the transceiver are oriented with respect to one another in such a way as to minimize the power of the self-interference component. For example, the transmit and receive antenna may be pairwise symmetrical. However, some self-interference from the transmit antenna to the receive antenna is unavoidable in practice. To cancel at least a portion of this self-interference component, the transceiver generates a radio-frequency corrective signal in step 316 based on the outgoing baseband signal. The radio-frequency corrective signal is combined in step 318 so as to cancel at least a portion of the self-interference component received in step 314.

The radio-frequency corrective signal generated in step 316 is selected so as to cancel the portion of the self-interference component due to the transmitted radio-frequency communication signal, but not to cancel the portion of the self-interference component due to the radio-frequency test signal. This un-cancelled radio-frequency test signal component will be used to provide a measure of the nonlinearities introduced by the signal amplification in step 310.

In step 320, the radio-frequency corrective signal is demodulated, and in step 322, the demodulated test signal is sampled by one or more analog-to-digital converters. Based on the sampled test signal the transceiver in step 324 determines the nonlinear distortion introduced by the power amplifier. For example, the transceiver may compare the frequency components of the sampled test signal and compare those with the original frequency components of the test signal in order to determine the amount of intermodulation distortion between frequencies. The nonlinear intermodulation distortion between respective frequency components is a function primarily of the differences between those respective frequencies, rather than a function of the absolute values of the frequencies. Consequently, the intermodulation distortion measured in the sideband test signal can be used to create a nonlinear model of the distortion of the outgoing baseband communication signal. This model may be, for example, a model based on a Volterra series, where the kernel coefficients of the Volterra series are measured through the sampling of the sideband test signal.

The transceiver may use the nonlinear model created in step 324 to update the model used for creation of the radio-frequency corrective signal in step 316. For example, the distortion as measured through the use of the sideband test signal can be applied during the generation of the radio frequency corrective signal 316, such that the radio frequency corrective signal more accurately mimics the self-interference component and thus leads to more effective signal cancellation in step 318.

The components of exemplary combined radio-frequency communication signals are illustrated in FIGS. 4 and 5. In FIG. 4, a combined radio-frequency communication signal includes a central outgoing radio-frequency signal 400 along with a pair of sideband test signals 402 and 404. In the example of FIG. 4, the outgoing radio-frequency signal consists of several individual subcarrier signals, each with an amplitude dependent on the signal being transmitted. The sideband test signals 402 and 404 are scaled, frequency-shifted replicas of the outgoing radio-frequency signal 400. That is, the amplitude of each subcarrier signal within the test signals is a scaled-down version of the amplitude of a corresponding subcarrier in the outgoing radio-frequency signal. The sideband test signals 402 and 404 are preferably separated from the outgoing radio-frequency signal 400 by respective guard bands 406 and 408 in which the transmitted spectral power is zero (except for power attributable to the intermodulation distortion itself). The guard bands 406 and 408 help to minimize leakage from the outgoing radio frequency signal 400 to the sideband test signals 402 and 404, and they facilitate separation of the signals. In such a configuration, when the test signal is a replica of the outgoing signal, the non-linearity affects the test signal and the outgoing signals in similar manners and this feature is used to compensate for the effect of nonlinearity.

In some embodiments, the sideband test signals need not be scaled replicas of the outgoing radio-frequency signal. As illustrated in FIG. 5, a combined radio-frequency communication signal includes a central outgoing radio-frequency signal 500 along with a pair of sideband test signals 502 and 504. The sideband test signals 502 and 504 are separated from the central outgoing radio-frequency signal 500 by respective guard bands 506 and 508. In this example, the sideband test signals consist of one or more sparsely-located pilot tones. The pilot tones are located among other frequency slots to which an amplitude of zero is assigned. Intermodulation distortion can be modeled by measuring, in the incoming radio-frequency signal, the effect of the pilot tones on the frequencies to which zero amplitude was assigned.

As illustrated in FIGS. 4 and 5, the power of the sideband test signals is lower than the power of the central outgoing radio-frequency signal. It should be noted, however, that the spectral powers illustrated in FIGS. 4 and 5 are not necessarily drawn to scale. Preferably, the level of sideband test signals are adjusted to have a transmit power that is significantly lower than the power of the outgoing radio-frequency signal, and a receive power that is significantly above the received power from the distant RF signals that may exist in those neighboring bands occupied by the test signals. For example, the level of sideband test signals are adjusted to have a power that is 40dB lower than the power of the central outgoing radio-frequency signal, and are received (at the same node) at a power level which is 20 dB above the received power from the distant RF signals that may exist in those neighboring bands occupied by the test signals. Preferably, the power of the sideband test signals is at least 20 dB greater than the power of a desired radio-frequency signal component.

Figure 6:
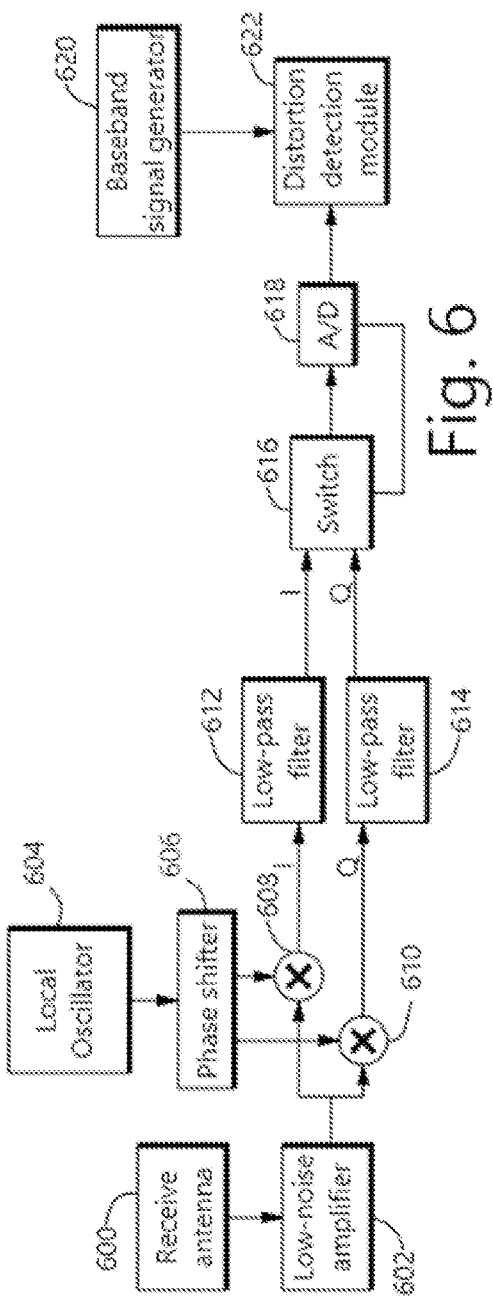
FIG. 6 is a functional block diagram of a receive chain used to measure signal distortion in an embodiment described herein.
Figure 7:
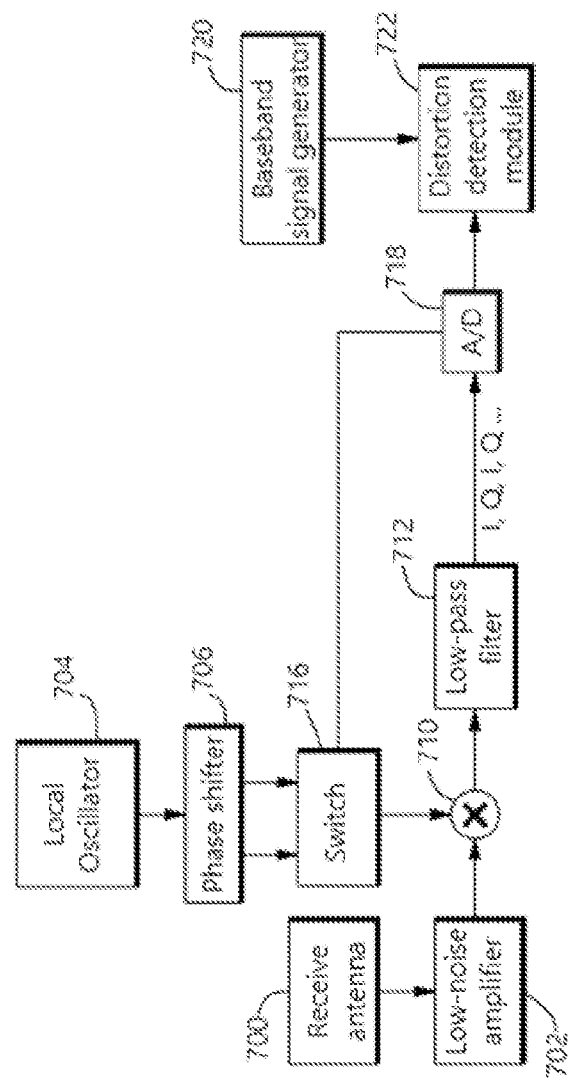
FIG. 7 is a functional block diagram of a receive chain used to measure signal distortion in another embodiment described herein.

FIGS. 6 and 7 illustrate exemplary components of a full-duplex transceiver that can be used for sampling an incoming radio-frequency signal to determine nonlinear distortion. Specifically, the examples of FIGS. 6 and 7 illustrate components that can be used in the receipt and sampling of signals that include an in-phase (I) component and a quadrature (Q) component. The componentry illustrated in FIGS. 6 and 7 allows the use of a single digital-to-analog converter despite the presence of both I and Q components in the incoming signal, thereby simplifying the componentry to be used.

In FIG. 6, an incoming radio-frequency signal is received at a receive antenna 600, which may be one of a plurality of receive antennas in a MIMO antenna system. The incoming signal is amplified by a low-noise amplifier 602. A local oscillator 604 is provided for generating a radio-frequency signal used to demodulate the incoming signal. Preferably, this is the same local oscillator signal used to modulate outgoing signals of the full-duplex transceiver, which reduces the effects of jitter on radio frequency interference cancellation. The signal from the local oscillator is provided to a phase shifter 606, which splits the local oscillator signal into two separate signals that differ from one another by a phase shift of 90°. The phase shifter 606 may be a Schiffman phase shifter. The system includes two frequency mixers 608, 610, each of which is provided with a respective local oscillator signal. The received radio-frequency signal is sent to both of these mixers 608, 610, one of which extracts the in-phase component and the other of which extracts the quadrature component of the incoming signal.

The separate in-phase and quadrature signals are sent through respective low-pass filters 612, 614 to remove undesirable high-frequency signals generated in the mixing process. The resulting filtered signals are provided to switching circuitry 616. Switching circuitry 616 alternately switches between the in-phase and quadrature component to be sampled by a single analog-to-digital converter 618. The analog-to-digital converter 618 is synchronized with the switching circuitry 616 such that the digital samples taken by the analog-to-digital converter 618 alternate repeatedly between a sample of the I component and a sample of the Q component. The transceiver is provided with a distortion detection module 622, which quantifies distortion by comparing the signal sampled by the analog-to-digital converter 618 with the outgoing baseband signal from the baseband signal generator 620. The distortion detection module 622 may operate to generate a nonlinear distortion model by, for example, calculating the kernel coefficients of a Volterra series representing nonlinearity introduced by a power amplifier of the transceiver.

In an alternative embodiment illustrated in FIG. 7, a radio-frequency signal is received at the receive antenna 700 and amplified by a low-noise amplifier 702. A local oscillator 704 provides a radio-frequency signal to use in demodulation of the received radio-frequency signal. The signal from the local oscillator is provided to a phase shifter 706, which splits the local oscillator signal into two separate signals that differ from one another by a phase shift of 90°. The phase shifter 706 may be a Schiffman phase shifter. The separate outputs of the phase shifter 706 are provided to a switch 716, which switches alternately between the two phase-shifted local oscillator signals. This alternating-phase signal is supplied to a mixer 710, which mixes the alternating-phase local-oscillator signal with the amplified incoming signal. Consequently, the output of the mixer 710 switches alternately between the demodulated in-phase component I and the demodulated quadrature component Q. The mixed signal is passed through a low-pass filter 712 to reject undesirable high-frequency components. A single analog-to-digital converter 718 is provided to alternately sample the demodulated I and Q components. The analog-to-digital converter 718 is synchronized with the switch 716 such that the digital samples taken by the analog-to-digital converter 718 alternate repeatedly between a sample of the I component and a sample of the Q component.

The transceiver is provided with a distortion detection module 722, which quantifies distortion by comparing the signal sampled by the analog-to-digital converter 718 with the outgoing baseband signal from the baseband signal generator 720. The distortion detection module 722 may operate to generate a nonlinear distortion model by, for example, calculating the kernel coefficients of a Volterra series representing nonlinearity introduced by a power amplifier of the transceiver.

In the systems of FIGS. 6 and 7, the alternate samples of the I and Q components can be reconstructed by the distortion detection modules 622, 722 into a single signal using the following technique. Where each pair of in-phase and quadrature samples is designated as $X_i$ and $Y_i$, respectively, the combined signal can be treated as a signal with amplitude $r_i$ and phase $\theta_i$, where $r_i=(X_i+Y_i)^{1/2}$, and $\theta_i=\arctan(X_i/Y_i)$.

Figure 11:
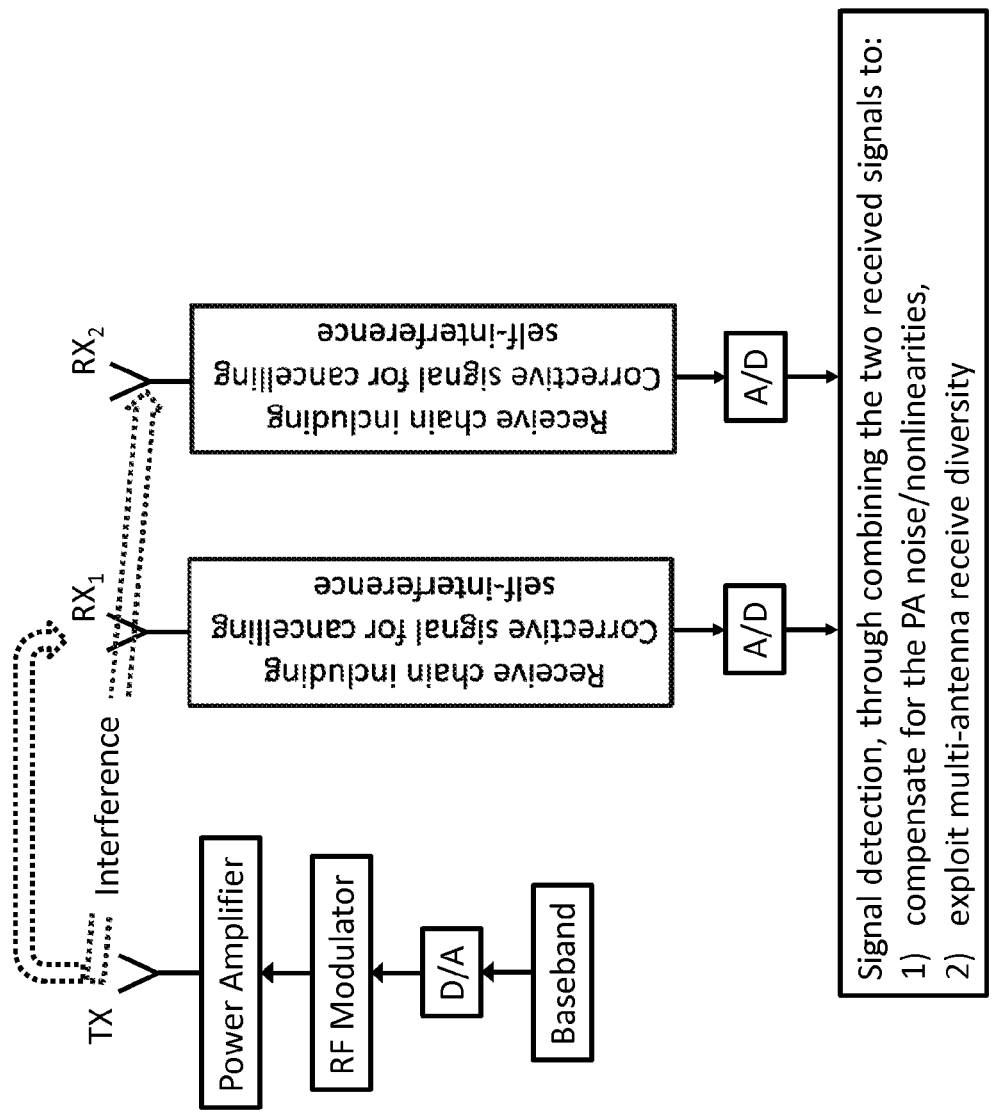
FIG. 11 is a schematic block diagram of a full-duplex transceiver using two receive chains.

In some embodiments, the path for the sampling of the power amplifier output is designed solely for this purpose. In such cases, the received base-band signals at 618 and 718, in addition to capturing the non-linearity, provide information about the noise generated by the power amplifier. It is also possible to have two complete receive chains (with two receive antennas) wherein the tasks of signal reception and power amplifier sampling are combined. Such an embodiment is illustrated schematically in FIG. 11. In this case, the signals at the base-bands of the two received chains contain a combination of the desired signal from distant transmitter and a sample of the power amplifier output (self-interference). These two signals are combined to maximize the signal-to-noise ratio of the desired signal from distant transmitter. The use of multiple antennas may then serve the dual role of not only helping with the cancellation of self-interference, but also with the increase in receive diversity. Mathematical expressions to maximize the signal-to-noise ratio of the desired signal from distant transmitter provide the best compromise between these two objectives. Note that this is different from standard maximum ratio combining used in multiple receive antennas. In exemplary embodiments, it is not a requirement for the receiver to recover the self-interference; rather, the goal is simply to minimize the impact of self-interference towards maximizing the signal-to-noise ratio of the signal from distant (desired) transmitter. Note that the number of transmit antennas can be also increased to two, wherein one transmit antenna is used to transmit the RF corrective signal. In another embodiment, a 2×2 antenna transceiver is configured to function in the following modes of operations depending on the rate requirements: (1) a 2×2 half-duplex mode, (2) a 1×1 full-duplex mode, (3) a combination of modes (1) and (2) wherein some OFDM tones send two streams of data from A to B, while the rest of the tones send one stream from A to B and one stream from B to A.

The modular components described herein, such as the digital decoding module 148, the baseband correction module 106, the radio-frequency correction module 120, and the distortion detection modules 622, 722, may be implemented by general purpose processors or by programmable logic devices programmed to perform the functions described herein. Alternatively, those components may be implemented with the use of special-purpose digital circuitry.

The systems and methods described above are intended as examples, and the scope of the invention is not limited to those examples. Rather, the scope of the invention is delineated by the following claims.

The invention claimed is:

1. A method performed in a full-duplex transceiver, comprising:
    generating a first analog corrective signal;
    receiving an incoming radio-frequency signal, wherein the incoming radio-frequency signal includes a self-interference component and a desired radio-frequency signal component;
    demodulating the incoming radio-frequency signal to generate a first demodulated signal;
    combining the first analog corrective signal with the first demodulated signal to generate a second demodulated signal with reduced self-interference;
    sampling the first demodulated signal to obtain a sampled self-interference component; and
    processing at least the second demodulated signal and the sampled self-interference component to determine a desired incoming baseband signal.

2. The method of claim 1, wherein the processing to determine the desired incoming baseband signal includes maximal-ratio combining of at least the second demodulated signal and the sampled self-interference component.

3. The method of claim 1, wherein the processing to determine the desired incoming baseband signal includes minimum mean square error processing of at least the second demodulated signal and the sampled self-interference component.

4. The method of claim 1, wherein the first demodulated signal includes a demodulated in-phase component and a demodulated quadrature component, and wherein the sampling of the first demodulated signal includes alternately sampling the in-phase component and the quadrature component.

5. The method of claim 1, wherein the first demodulated signal includes an in-phase component and a quadrature component, and wherein the sampling of the first demodulated signal includes sampling the in-phase component and the quadrature component with a single analog-to-digital converter.

6. The method of claim 1, further comprising:
    generating a second analog corrective signal at a radio frequency; and
    combining the second analog corrective signal with the incoming radio-frequency signal to cancel at least a portion of the self-interference component.

7. The method of claim 6, wherein the generation of the first and second corrective signals is performed by:
    generating a combined corrective signal at a digital-to-analog converter;
    modulating the combined corrective signal to generate the second analog corrective signal at the radio frequency; and
    filtering the combined corrective signal to generate the first analog corrective signal.

8. The method of claim 7, wherein the filtering is low-pass filtering, and the first analog corrective signal is a baseband signal.

9. The method of claim 7, wherein the filtering is bandpass filtering, and the first analog corrective signal is an intermediate-frequency signal.

10. The method of claim 1, wherein the combining of the first analog corrective signal with the first demodulated signal is performed by an operational amplifier circuit.

11. The method of claim 1, wherein the combining of the first analog corrective signal with the first demodulated signal is performed by a passive transformer circuit.

12. The method of claim 1, further comprising:
    modulating an outgoing baseband signal to generate an outgoing radio-frequency communication signal;
    amplifying the outgoing radio-frequency communication signal using a power amplifier; and
    transmitting the outgoing radio-frequency communication signal from a transmit antenna of the full-duplex transceiver, wherein the self-interference component is caused by the transmission of the outgoing radio-frequency communication signal.

13. The method of claim 12, wherein the generating of the first analog corrective signal includes applying a first predetermined transformation to the outgoing baseband signal.

14. The method of claim 12, further comprising:
    generating a second analog corrective signal at a radio frequency; and
    combining the second analog corrective signal with the incoming radio-frequency signal to cancel at least a portion of the self-interference component.

15. The method of claim 12, wherein the outgoing radio-frequency communication signal is an orthogonal frequency-division multiplexing signal.

16. The method of claim 1, further comprising processing at least the sampled self-interference component to determine nonlinear distortion introduced by the power amplifier.

17. The method of claim 13, further comprising using the determined nonlinear distortion to determine the first analog corrective signal.

18. The method of claim 1, wherein the first analog corrective signal and the first demodulated signal are intermediate-frequency signals.

19. The method of claim 1, wherein the first analog corrective signal and the first demodulated signal are intermediate-frequency signals, and wherein the demodulation of the incoming radio-frequency signal to generate the first demodulated signal is performed without the use of image-rejection circuitry.

20. The method of claim 12, further comprising:
sampling the outgoing radio-frequency communication signal;
adjusting the phase and magnitude of the sampled radio-frequency communication signal to generate a radio-frequency corrective signal; and
combining the radio-frequency corrective signal with the incoming radio-frequency signal to reduce the self-interference component.

21. The method of claim 20, wherein the sampling of the outgoing radio-frequency communication signal is performed at the output of a power amplifier.

22. The method of claim 12, further comprising:
obtaining a plurality of samples of the outgoing radio-frequency communication signal;
successively adjusting the phase and magnitude of each of the sampled radio-frequency communication signals to generate a plurality of radio-frequency corrective signals; and
combining the plurality of radio-frequency corrective signals with the incoming radio-frequency signal to reduce the self-interference component.

23. The method of claim 22, wherein the plurality of samples are obtained at different frequencies.

24. The method of claim 22, wherein the adjustment of the phase and magnitude of each of the sampled radio-frequency communication signals includes adjustment of the phase and amplitude to compensate for a respective leakage path.

25. The method of claim 22, wherein adjusting the phase and magnitude of each of the sampled radio-frequency communication signals includes adjustment of a respective tunable delay circuit.

26. A full-duplex transceiver comprising:
a radio-frequency modulator configured to modulate an outgoing baseband signal into an outgoing radio-frequency communication signal;
a transmit antenna configured to transmit the outgoing radio-frequency communication signal;
a receive antenna configured to receive an incoming radio-frequency signal;
a radio-frequency demodulator configured to demodulate the incoming radio-frequency signal to generate a first demodulated signal;
a baseband correction module configured to generate a baseband analog corrective signal based on the outgoing baseband signal;
baseband signal addition circuitry configured to add the baseband analog corrective signal to the first demodulated signal to generate a second demodulated signal;
a first analog-to-digital converter configured to sample the first demodulated signal;
a second analog-to-digital converter configured to sample the second demodulated signal; and
a digital decoding module configured to determine a desired incoming baseband signal based at least on the sampled first and second demodulated signals.

27. The transceiver of claim 26, wherein the baseband signal addition circuitry includes an operational amplifier.

28. The transceiver of claim 26, wherein the signal addition circuitry includes passive transformer circuitry.

29. The transceiver of claim 26, further comprising:
a radio-frequency correction module configured to generate a radio-frequency analog corrective signal; and
radio-frequency signal addition circuitry configured to add the radio-frequency analog corrective signal to the incoming radio-frequency signal.

30. The transceiver of claim 26, wherein the digital decoding module is configured to determine the desired incoming baseband signal based on maximal-ratio combining of the sampled first and second demodulated signals.

31. The transceiver of claim 26, wherein the digital decoding module is configured to determine the desired incoming baseband signal based on minimum mean square error processing of the sampled first and second demodulated signals.

* * * * *